(12) United States Patent
Lin et al.

(10) Patent No.: US 12,202,146 B2
(45) Date of Patent: Jan. 21, 2025

(54) METHOD OF ROBOTIC SYSTEM DYNAMIC VELOCITY MODIFICATION

(71) Applicant: FANUC CORPORATION, Yamanashi (JP)

(72) Inventors: Hsien-Chung Lin, Fremont, CA (US); Tetsuaki Kato, Fremont, CA (US)

(73) Assignee: FANUC CORPORATION, Yamanashi (JP)

(*) Notice: Subject to any disclaimer, the term of this patent is extended or adjusted under 35 U.S.C. 154(b) by 616 days.

(21) Appl. No.: 17/502,699

(22) Filed: Oct. 15, 2021

(65) Prior Publication Data
US 2023/0123463 A1   Apr. 20, 2023

(51) Int. Cl.
  *B25J 9/16* (2006.01)
  *B25J 13/08* (2006.01)

(52) U.S. Cl.
  CPC .......... *B25J 9/1666* (2013.01); *B25J 9/1651* (2013.01); *B25J 9/1676* (2013.01); *B25J 9/1682* (2013.01); *B25J 13/08* (2013.01); *G05B 2219/34216* (2013.01); *G05B 2219/39001* (2013.01)

(58) Field of Classification Search
  CPC ........ B25J 9/1666; B25J 13/08; B25J 9/1682; B25J 9/1676; G05B 2219/40477; G05B 2219/39001; G05B 2219/39091; G05B 2219/40425
  See application file for complete search history.

(56) References Cited

U.S. PATENT DOCUMENTS

| | | | | |
|---|---|---|---|---|
| 10,513,034 B2* | 12/2019 | Bretschneider | .... | G05B 19/4061 |
| 2016/0221193 A1* | 8/2016 | Sato | ...... | B25J 13/085 |
| 2017/0028554 A1* | 2/2017 | Gomi | ...... | B25J 13/088 |
| 2017/0080565 A1* | 3/2017 | Dalibard | ...... | B25J 9/1694 |
| 2017/0210008 A1* | 7/2017 | Maeda | ...... | B25J 9/1682 |
| 2019/0001490 A1* | 1/2019 | Washizu | ...... | B25J 9/1651 |
| 2020/0086487 A1* | 3/2020 | Johnson | ...... | B25J 9/1697 |
| 2021/0378769 A1* | 12/2021 | Zhou | ...... | B25J 9/1689 |

OTHER PUBLICATIONS

Lucas Joseph, Joshua Pickard, Vincent Padois, David Daney, Online Velocity Constraint Adaptation for Safe and Efficient Human-Robot Workspace Sharing, International Conference on Intelligent Robots and Systems, Oct. 2020, Las Vegas, United States.

* cited by examiner

*Primary Examiner* — Wade Miles
*Assistant Examiner* — Mohammed Yousef Abuelhawa
(74) *Attorney, Agent, or Firm* — John A. Miller; Shumaker, Loop & Kendrick, LLP

(57) ABSTRACT

A method and system for robotic motion planning which perform dynamic velocity attenuation to avoid robot collision with static or dynamic objects. The technique maintains the planned robot tool path even when speed reduction is necessary, by providing feedback of a computed slowdown ratio to a tracking controller so that the path computation is always synchronized with current robot speed. The technique uses both robot-obstacle distance and relative velocity to determine when to apply velocity attenuation, and computes a joint speed limit vector based on a robot-obstacle distance, a maximum obstacle speed, and a computed stopping time as a function of the joint speed. Two different control structure implementations are disclosed, both of which provide feedback of the slowdown ratio to the motion planner as needed for faithful path following. A method of establishing velocity attenuation priority in multi-robot systems is also provided.

25 Claims, 11 Drawing Sheets

METHOD OF ROBOTIC SYSTEM DYNAMIC VELOCITY MODIFICATION

BACKGROUND

Field

The present disclosure relates generally to the field of industrial robot motion planning and, more particularly, to a method and system for robotic motion planning which performs dynamic velocity attenuation to avoid collision with static or dynamic objects, while maintaining the planned tool path even when speed reduction is necessary.

Discussion of the Related Art

The use of industrial robots to perform a wide range of manufacturing, assembly and material movement operations is well known. In many robot workspace environments, obstacles are present and may sometimes be in the path of the robot's motion. The obstacles may be permanent objects such as building structures and fixtures, which can easily be avoided by the robot with pre-planned motions due to the static nature of the object. The obstacles may also be dynamic objects which move into or through the robot workspace, sometimes at random. Dynamic objects must be accounted for in real-time calculations by the motion planning system, where the robot must adjust its motion to avoid the objects while performing an operation. Collisions between any part of the robot and any obstacle must absolutely be avoided.

Various techniques have been developed to detect objects in a robot's workspace and adjust the robot motion if necessary to avoid collision or near-collision of the robot with the object. One such prior art technique simply stops the robot if an object is detected within a threshold distance. In most applications, however, stopping the robot in the presence of workspace obstacles is not a satisfactory solution. Another technique commonly used with industrial robots is the definition of "safety zones" where a human operator or other dynamic object may safely exist, as the robot is pre-programmed to prohibit robot movement into the safety zone. Safety zones are effective, but require additional pre-programming effort, and are often overly restrictive of robot motion—including geometrically-shaped prohibited zones which consume more workspace volume than necessary, and enforcement of the prohibited safety zones even when they are unoccupied by obstacles.

Yet another technique for robot collision avoidance motion planning adjusts the speed of the robot in real time based on detected objects. This technique determines an appropriate robot joint speed limit based on a robot-obstacle distance, a maximum obstacle speed, and a computed stopping time as a function of the joint speed. However, this technique allows the tracking control computation to get out of synchronization with the commanded robot motion, such that the robot tool can deviate from the programmed path—particularly when the programmed path is curved, and there is a large amount of slowdown required to maintain a safe robot-obstacle distance.

In light of the circumstances described above, there is a need for an improved dynamic motion planning technique for robots which reduces robot speed when necessary to avoid obstacles, while faithfully following the programmed robot tool path.

SUMMARY

In accordance with the teachings of the present disclosure, a method and system for robotic motion planning are provided which perform dynamic velocity attenuation to avoid robot collision with static or dynamic objects. The technique maintains the planned robot tool path even when speed reduction is necessary, by providing feedback of a computed slowdown ratio to a tracking controller so that the path computation is always synchronized with current robot speed. The technique uses both robot-obstacle distance and relative velocity to determine when to apply velocity attenuation, and computes a joint speed limit vector based on a robot-obstacle distance, a maximum obstacle speed, and a computed stopping time as a function of the joint speed. Two different control structure implementations are disclosed, both of which provide feedback of the slowdown ratio to the motion planner as needed for faithful path following. A method of establishing velocity attenuation priority in multi-robot systems is also provided.

Additional features of the presently disclosed systems and methods will become apparent from the following description and appended claims, taken in conjunction with the accompanying drawings.

DETAILED DESCRIPTION OF THE EMBODIMENTS

The following discussion of the embodiments of the disclosure directed to methods and systems for robotic system dynamic velocity modification is merely exemplary in nature, and is in no way intended to limit the disclosed devices and techniques or their applications or uses.

It is well known to use industrial robots for a variety of manufacturing, assembly and material movement operations. These operations include spray painting, welding, part pick and place tasks, and many others. In many robot workspace environments, obstacles may be present and may at times be in the path of the robot's motion. That is, without adaptive motion planning, some part of the robot may collide with some part of an obstacle when the robot moves from its current position to a destination position. The obstacles may be static structures such as fixtures and tables, or the obstacles may be dynamic (moving) objects such as people, forklifts, other robots and other machines. When dynamic objects may be present, the robot's motion must be planned in real time for each control cycle.

In some robotic applications, the robot's path can be adjusted to move around an obstacle. However, in many applications, the robot (tool center) must move along a planned reference path in order to complete the task properly. In these defined-path applications, the only recourse when an obstacle obstructs the robot's path is to slow down or stop the robot. Techniques have been developed for modifying a robot's speed in response to the presence of an obstacle. However, these techniques suffer from various drawbacks—including too frequently stopping the robot in the presence of an obstacle, and deviating from the planned reference path when the robot's speed is reduced.

The present disclosure provides methods and systems which adaptively respond to the presence of obstacles in the robot workspace, slowing the robot down only as necessary to allow the potential collision to clear, while maintaining the planned reference path of the tool. The technique has been tested in simulation and real world experiments, including both multi-robot environments and human-robot interactions. These methods and systems, including two different implementation embodiments, are discussed in detail below.

In any technique which slows down a robot in response to the presence of a workspace obstacle, it is necessary to determine how much the robot needs to be slowed down. The amount of slowdown is based on several factors, including current robot velocity (actually a vector of rotational velocities, one for each joint in the robot), a stopping time calculated from the current velocity and robot mechanical constraints, and distance and velocity properties of the obstacle.

Figure 1:
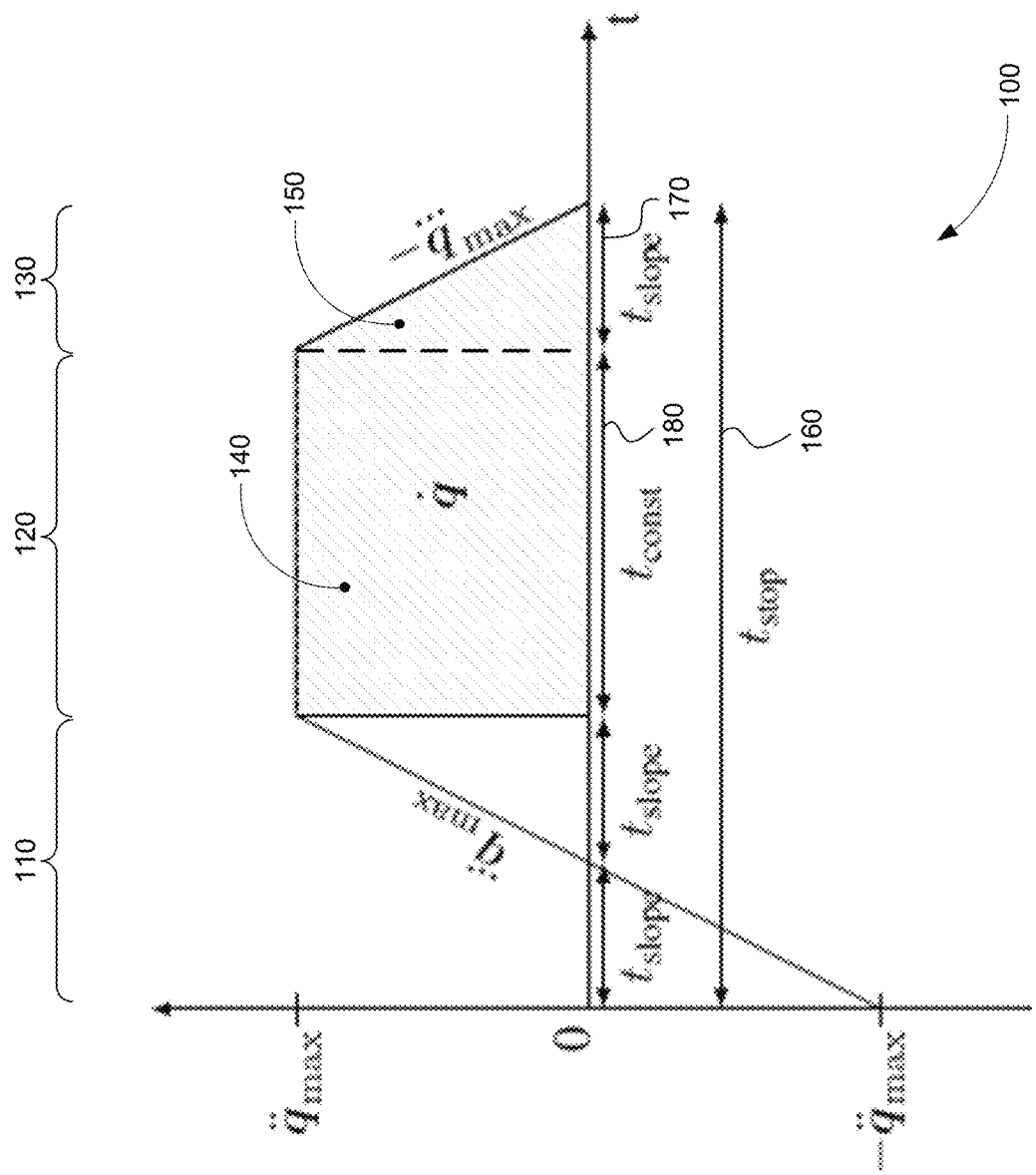
FIG. 1 is a graph showing how a robot stopping time is computed from robot joint velocity and maximum joint acceleration and jerk constraints, in a manner known in the art.

FIG. 1 is a graph 100 showing how a robot stopping time is computed from robot joint velocity and maximum joint acceleration and jerk constraints, in a manner known in the art. The graph 100 plots joint acceleration on a vertical axis against time on a horizontal axis. Consider the graph 100 to represent a single robot joint, where the same calculation is performed for each of the (five or six) joints in the robot. At time t=0, the joint has a velocity $-\dot{q}$ and a maximum acceleration $-\ddot{q}$ toward the obstacle. In order to stop the robot joint, a maximum jerk (rate of change of acceleration) $\dddot{q}_{max}$ must be applied in a first phase 110 until a maximum acceleration $\ddot{q}_{max}$ is reached. The maximum jerk and maximum acceleration values for each joint are known mechanical limitations of the robot. In a second phase 120, the robot joint maintains the maximum acceleration $\ddot{q}_{max}$. In a third phase 130, the acceleration drops off at a rate of the negative of the maximum jerk $\dddot{q}_{max}$.

The area under the curve of a graph of acceleration vs. time is velocity. The two triangular portions of area under the curve in the first phase 110 cancel each other out. The remaining portion of area under the curve is the shaded area of the graph 100, comprised of a rectangular portion 140 and a triangular portion 150. The total area of the rectangular portion 140 and the triangular portion 150 must add up to a value of $\dot{q}$ in order to take the joint from the initial velocity $-\dot{q}$ to a stop. That is, $$\dot{q} = \frac{1}{2} t_{slope} \ddot{q}_{max} + t_{const} \ddot{q}_{max} \quad (1)$$

The total stopping time of the robot, $t_{stop}$, is represented by arrow 160. The total stopping time $t_{stop}$ is made up of three maximum jerk segments 170 (designated $t_{slope}$) and one maximum acceleration segment 180 ($t_{const}$). That is, $$t_{stop} = 3 t_{slope} + t_{const} \quad (2)$$

Furthermore, the duration of the maximum jerk segments 170 can be determined by:

$$t_{slope} = \ddot{q}_{max} / \dddot{q}_{max} \quad (3)$$

Evaluating Equations (1)-(3) for each of the joints i in the robot, the robot stopping time $t_{stop}$ can be determined based on the robot joint velocities as follows:

$$t_{stop} = \max_{i=1,\ldots,n} \left( \frac{|\dot{q}_i|}{\ddot{q}_{i,max}} + 2.5 \frac{\ddot{q}_{i,max}}{\dddot{q}_{ti,max}} \right) \quad (4)$$

Where $|\dot{q}_i|$ is the absolute value of the velocity of each joint i, and all other values are known constants (mechanical constraints of each joint).

Finally, an appropriate robot speed limit can be determined for each joint i in the robot, for operation in the presence of an obstacle, as follows:

$$|\dot{q}_{i,brake}| = \max\left(0, \min\left(\dot{q}_{i,max}, \left(t_{stop} - 2.5 \frac{\ddot{q}_{i,max}}{\dddot{q}_{ti,max}}\right) \ddot{q}_{i,max}\right)\right) \quad (5)$$

Where all constants and variables in Equation (5) have been defined above, and the speed limit $\dot{q}_{i,brake}$ is determined for each joint i in the robot. For an obstacle in the robot workspace having a robot-obstacle distance $d_{obs}$ and a maximum velocity $v_{max}$ of the obstacle itself or the robot-obstacle relative velocity, the value of $t_{stop}$ can be determined as $t_{stop}=d_{obs}/v_{max}$, and inserted into Equation (5) to calculate the joint speed limits.

Figure 2:
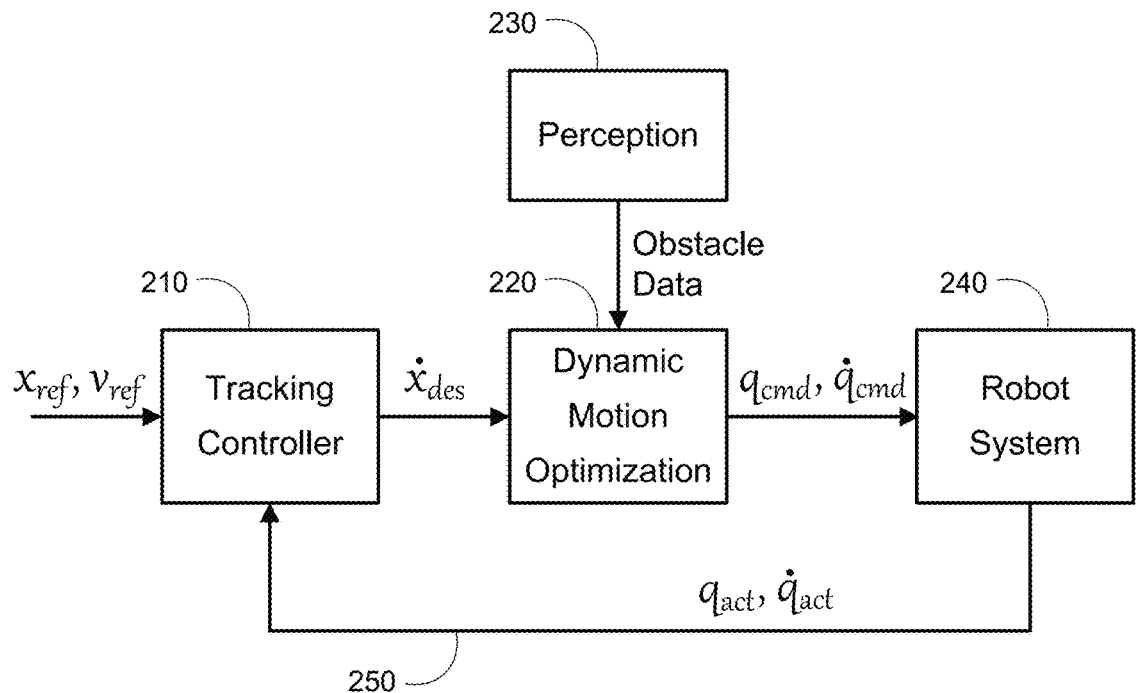
FIG. 2 is a block diagram illustration of a dynamic motion optimization technique known in the art, where robot velocity may be reduced in the presence of a workspace obstacle.

FIG. 2 is a block diagram illustration of a dynamic motion optimization technique known in the art, where robot velocity may be reduced in the presence of a workspace obstacle. A tracking controller 210 receives as input a reference position $x_{ref}$ and a reference velocity $v_{ref}$, which define a target tool center path and velocity (both in Cartesian coordinates). The tracking controller 210 computes a desired velocity vector $\dot{x}_{des}$ based on the reference inputs and feedback from the robot (discussed below), and provides the desired velocity vector $\dot{x}_{des}$ to a dynamic motion optimization module 220.

The dynamic motion optimization module 220 receives obstacle data input from a perception module 230, and computes robot joint position and velocity commands, $q_{cmd}$ and $\dot{q}_{cmd}$, respectively. The joint command output from the dynamic motion optimization module 220 includes slowdown of the robot if necessary based on the workspace obstacle data. The dynamic motion optimization module 220 uses Equations (1)-(5) above to compute reduced robot joint speeds in the presence of workspace obstacles. A robot system 240 includes a controller and a robot, where the controller causes the robot to follow the joint commands from the dynamic motion optimization module 220. The robot system 240 provides actual joint state (position and velocity) data, $q_{act}$ and $\dot{q}_{act}$, respectively, as feedback on line 250 to the tracking controller 210.

Figure 3:
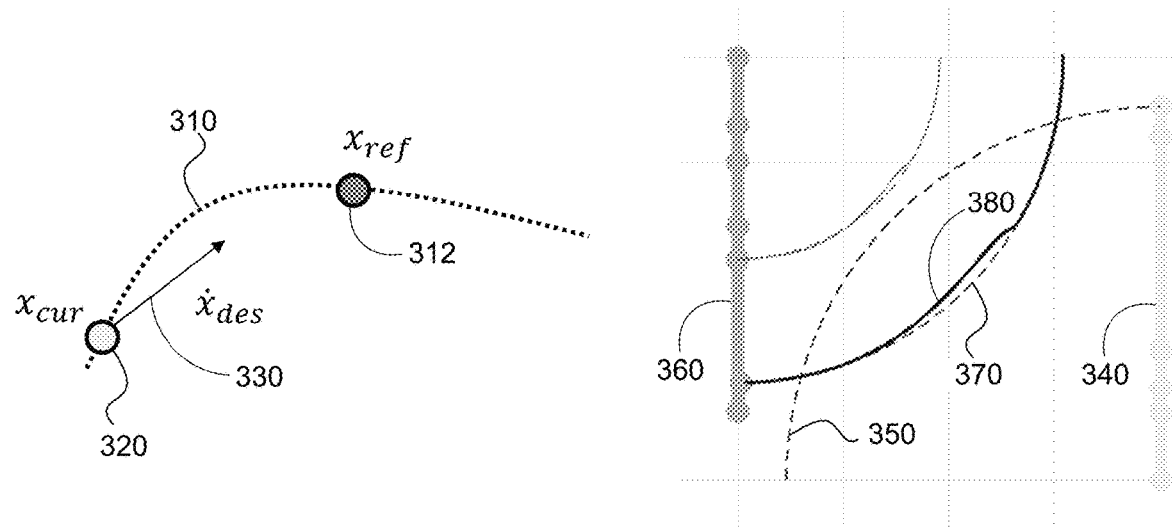
FIG. 3 is an illustration of how a commanded tool path position can deviate from a planned reference path when velocity is reduced in the prior art technique of FIG. 2.

FIG. 3 is an illustration of how a commanded tool path position can deviate from a planned reference path when velocity is reduced in the prior art technique of FIG. 2. On the left-hand side of FIG. 3, a curve 310 represents the target tool center path, which is reference position $x_{ref}$ defined above, and a point 312 is one particular point along the tool center path $x_{ref}$. The $x_{ref}$ point 312 is the point that was most recently computed by the tracking controller 210. A current position point $x_{cur}$ 320 indicates the current actual tool center point of the robot. Because the current position point $x_{cur}$ 320 is well behind the $x_{ref}$ point 312, due to a robot slowdown commanded by the dynamic motion optimization module 220, the tracking controller 210 computes a desired velocity vector $\dot{x}_{des}$ (arrow 330) which is not along the curve 310 defining the reference path. This causes the robot's actual path to deviate from the reference path 310. This effect can be seen in the illustrations on the right-hand side of FIG. 3.

A multi-link robot arm 340 is shown in top view. The robot arm 340 has a tool center point which follows a reference path 350. A robot arm 360 operates in the same workspace as the robot arm 340, where the robot arm 360 is programmed for its tool center point to follow a reference path 370. The reference paths 350 and 370 overlap, and thus the robot arms 340 and 360 would collide with each other if no obstacle detection and avoidance measures were taken. In this example, the robot arm 340 carries out its motion with no collision avoidance measures, while the robot arm 360 is programmed with the dynamic motion optimization technique of FIG. 2. That is, the robot arm 360 will be commanded to slow down when the robot arm 340 is in its path.

An actual path 380 shows the actual path taken by the tool center point of the robot arm 360. It can be seen that the actual path 380 deviates from the reference path 370 in the middle portion of the paths. This path deviation from reference is undesirable, and is caused by the effect discussed above—namely, the dynamic motion optimization module 220 commands a slowdown of the robot arm 360 due to the obstacle in its path, but the tracking controller 210 does not adequately recognize the slowdown and provides desired velocity instructions which cause the actual path to deviate from the reference path.

The techniques of the present disclosure have been developed to overcome the drawbacks of the prior art dynamic motion optimization technique discussed above.

Figure 4:
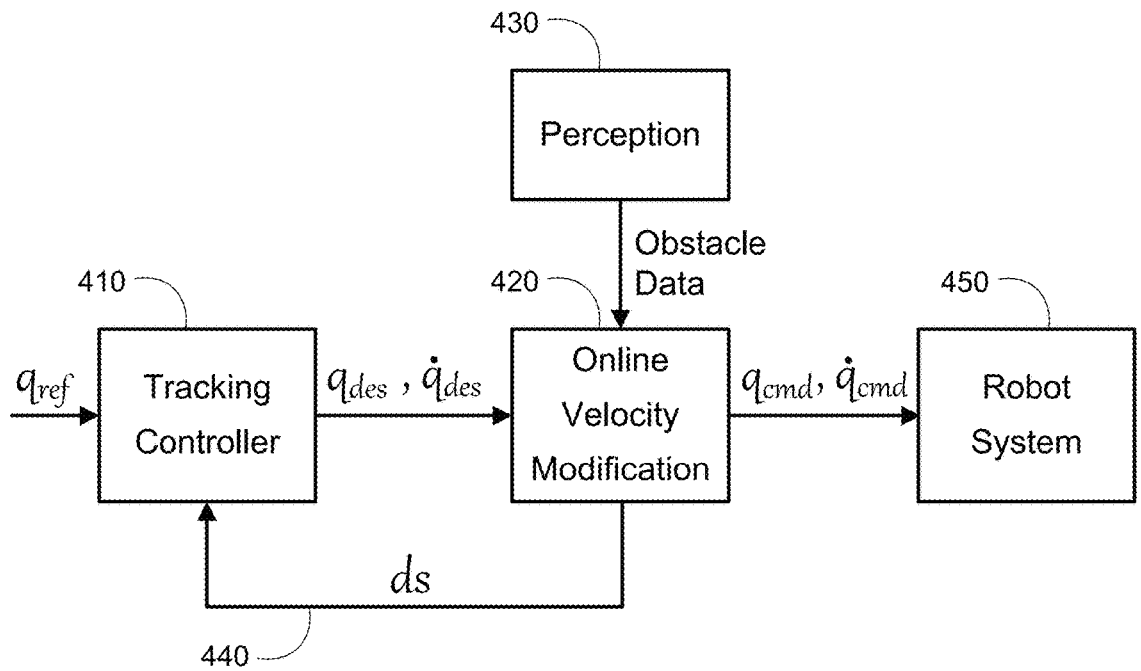
FIG. 4 is a block diagram illustration of a dynamic motion optimization system where robot velocity may be reduced in the presence of a workspace obstacle, and a slowdown factor is provided as feedback from an online velocity modification (OVM) module to a tracking controller, according to an embodiment of the present disclosure.

FIG. 4 is a block diagram illustration of a dynamic motion optimization system 400, and flowchart diagram of a corresponding method, where robot velocity may be reduced in the presence of a workspace obstacle, and a slowdown factor is provided as feedback from an online velocity modification (OVM) module to a tracking controller, according to an embodiment of the present disclosure. A tracking controller 410 receives as input a reference position $q_{ref}$, which defines a target (planned) robot path in joint coordinates. The tracking controller 410 computes desired robot joint position and velocity vectors, ($q_{des}$ and $\dot{q}_{des}$, respectively) based on the reference path input, and provides the desired joint position and velocity vector data to an online velocity modification module 420.

The online velocity modification module 420 receives obstacle data input from a perception module 430, and computes robot joint position and velocity commands, $q_{cmd}$ and $\dot{q}_{cmd}$, respectively. The joint command output from the online velocity modification module 420 includes slowdown of the robot if necessary based on the workspace obstacle data. The online velocity modification module 420 uses Equations (1)-(5) discussed above to compute reduced robot joint speeds in the presence of workspace obstacles. The amount of robot speed attenuation computed by the online velocity modification module 420 is embodied in a slowdown ratio ds, where the value of ds is in a range from zero (ds=0; full stop of robot) to one (ds=1; full speed of robot per the planned motion; no slowdown; in this case, $\dot{q}_{des}=\dot{q}_{cmd}$). The value of ds is provided as feedback on a line 440 from the online velocity modification module 420 to the tracking controller 410.

A robot system 450 includes a controller and a robot, where the controller causes the robot to follow the joint commands ($q_{cmd}$ and $\dot{q}_{cmd}$) from the online velocity modification module 420. The robot in the robot system 450 provides actual joint state data, $q_{act}$ and $\dot{q}_{act}$, as feedback to the controller in the robot system 450. However, because the slowdown ratio ds from the online velocity modification module 420 is already known by the tracking controller 410, feedback of robot state data from the robot system 450 to the tracking controller 410 is not needed. That is, the online velocity modification module 420 provides the value of ds as feedback to the tracking controller 410, whereby the tracking controller 410 takes the robot slowdown into account when computing the desired robot joint position and velocity vectors, ($q_{des}$ and $\dot{q}_{des}$, respectively). This is illustrated further in the following figure.

Figure 5:
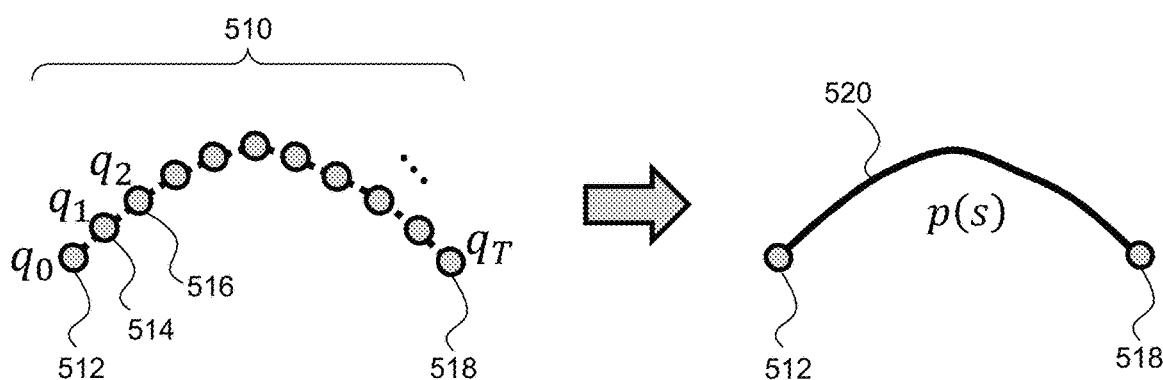
FIG. 5 is an illustration of how a planned reference path comprised of a sequence of interpolation points is parameterized into a continuous path defined by an arc length s, in the system of FIG. 4, according to an embodiment of the present disclosure.

FIG. 5 is an illustration of how a planned reference path comprised of a sequence of interpolation points is parameterized into a continuous path defined by an arc length s, in the system of FIG. 4, according to an embodiment of the present disclosure. A planned reference path 510 is defined by a plurality of interpolation points $q_0$ (512), $q_1$ (514), $q_2$ (516), ... and so forth through a final target point $q_T$ (518).

The planned reference path 510 is provided as input to the tracking controller 410 as shown in FIG. 4 and discussed above.

On the right, a continuous reference path 520 is computed as a function of an arc length parameter s, where s=0 at the initial path point $q_0$ (512), and s=1 at the final (target) point $q_T$ (518). The continuous reference path p(s) 520 is computed by the tracking controller 410 using any suitable technique, such as a spline function. The continuous reference path p(s) 520 is then used by the tracking controller 410, along with the slowdown ratio ds feedback, as follows. At each computation cycle, the tracking controller 410 would ordinarily increment the value of s in order to move along the continuous reference path 520, in an amount consistent with the time duration of the reference path motion and the time increment of the computation cycle. If the feedback from the online velocity modification module 420 indicates that the value of ds=1, then the tracking controller 410 increments the value of s in the full amount for this computation cycle. On the other hand, if the feedback from the online velocity modification module 420 indicates that the value of ds=0, then the tracking controller 410 does not increment the value of s at all for this computation cycle, which means that $q_{des}$ does not change from the previous computation cycle, $\dot{q}_{des}$ becomes zero, and the robot stops. If 0<ds<1, then the tracking controller 410 increments the value of s in an amount proportional to ds for the current computation cycle; this means that the robot slows down from its planned motion, which is the desired response in the presence of a qualifying workspace obstacle.

Returning to FIG. 4, the online velocity modification module 420 receives the obstacle data from the perception module 430 and performs a velocity modification optimization at each computation cycle as follows:

$$\min_{\dot{q}} \|q_{des} - q\|^2 + \lambda \|\dot{q}\| \quad (6)$$

$$\text{s.t. } \|\dot{q}_i\| \le |\dot{q}_{i,brake}| \quad (7)$$

Where Equation (6) is the optimization objective function which minimizes path deviation between a computed path q and the desired path $q_{des}$, and Equation (7) is a constraint equation on the individual robot joint velocities, and where $|\dot{q}_{i,brake}|$ (in Equation (7)) is computed from Equation (5) discussed previously. In this way, the online velocity modification module 420 determines if slowdown is necessary based on the obstacle data, and if so, computes the individual joint speed limits based on the stopping time $t_{stop}$.

After the optimization computation has converged, a value of the slowdown ratio ds is computed by:

$$ds = \min(|\dot{q}_{brake}|/|\dot{q}_{max}|) \quad (8)$$

Where Equation (8) calculates the ratio of $|\dot{q}_{brake}|$ to $|\dot{q}_{max}|$ for each robot joint i, and uses the minimum joint speed ratio value as the slowdown ratio ds.

As discussed above, the value of the slowdown ratio ds is provided as feedback from the online velocity modification module 420 to the tracking controller 410. The tracking controller 410 then computes a new value of the arc length parameter as s=s+ds. That is, if ds=1, the arc length parameter is incremented by a full step, and if ds=0, the arc length parameter does not change and the robot stops. The new desired position along the path is then computed by $x_{des}=x_{ref}(s)$ (in Cartesian space) or $q_{des}=q_{ref}(s)$ (in joint space). In this way, the tracking controller 410 provides new desired joint positions $q_{des}$ which immediately reflect any obstacle-avoidance robot joint speed reductions commanded by the online velocity modification module 420. This immediate adjustment by the tracking controller 410 causes the commanded robot motions $q_{cmd}$ to faithfully follow the target reference path $q_{ref}$.

The block diagram illustration of FIG. 4 also serves as a flowchart diagram illustration of a method for adaptive robot velocity modification, according to the present disclosure. That is, the method includes providing workspace obstacle data, using the obstacle data and a reference path to determine if velocity attenuation is needed for obstacle avoidance including computing the slowdown ratio ds, computing a commanded robot motion using the slowdown ratio and a desired motion, using the slowdown ratio and the reference path to compute the desired motion for the next control cycle (feedback loop 440), and providing the commanded robot motion to the robot system.

In the system and method of FIG. 4, the parameterization of the sequence of interpolation points into a continuous path, as depicted in FIG. 5, is optional. This parameterization may be implicitly performed in the robot controller's motion system in which, in some embodiments discussed below, the online velocity modification calculations are embedded. In other embodiments, the parameterization shown in FIG. 5 is an explicit step performed on a computer other than the robot controller. In all embodiments, the input of a reference path (depicting a planned task motion for the robot) is required.

Figure 6:
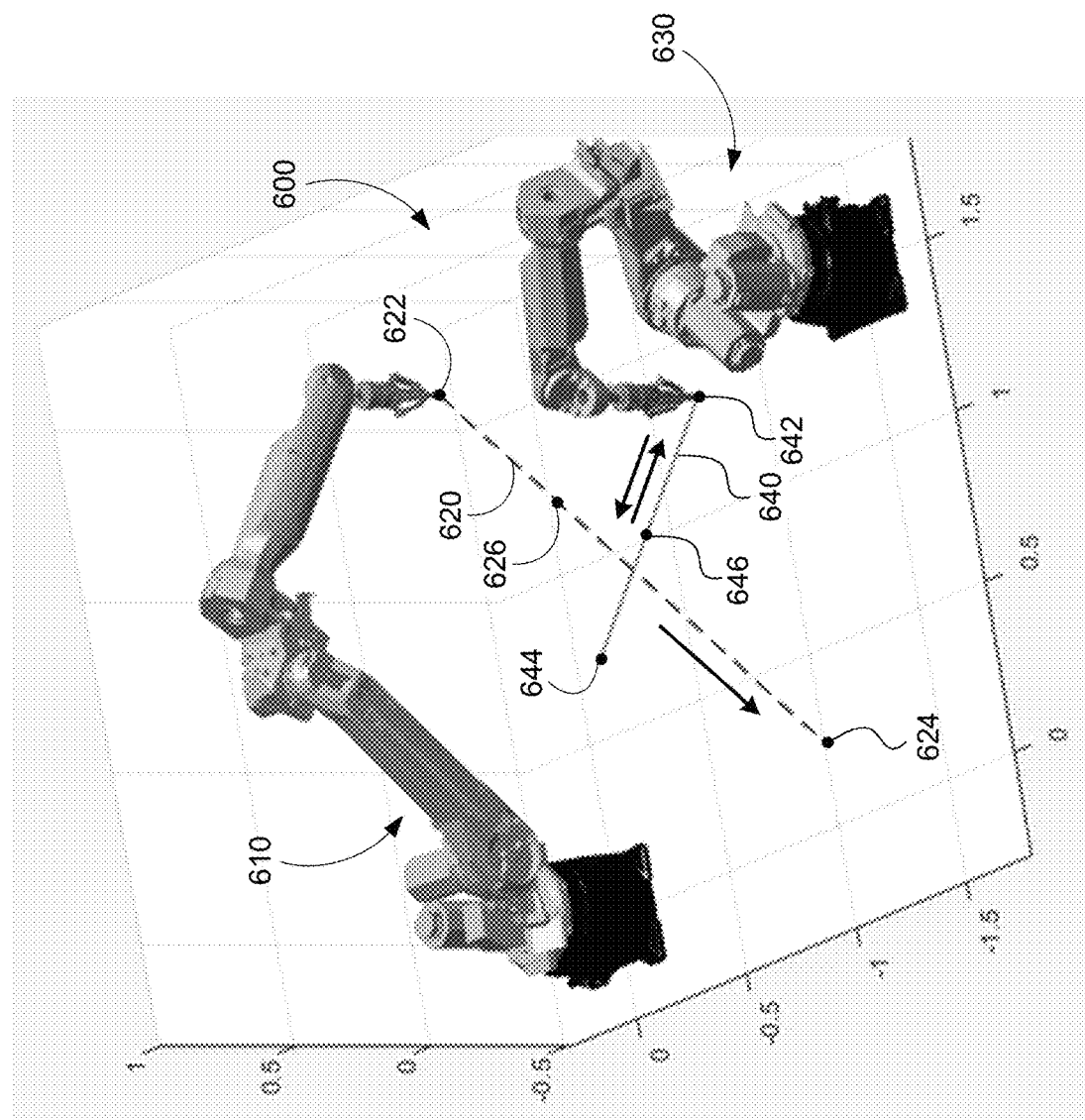
FIG. 6 is an illustration of a two-robot system with intersecting paths, with simulation results showing how collision is prevented when the online velocity modification technique of FIG. 4 is implemented in one of the robots, according to an embodiment of the present disclosure.

FIG. 6 is an illustration of a two-robot system with intersecting paths, with simulation results showing how collision is prevented when the online velocity modification technique of FIG. 4 is implemented in one of the robots, according to an embodiment of the present disclosure. A robot 610 and a robot 630 operate in a shared workspace 600 depicted by a three dimensional (3D) Cartesian grid in FIG. 6. The robot 610 is programmed to follow a path 620, one way, from a start point 622 to an end point 624. The robot 630 is programmed to follow a path 640, both ways, from a start point 642 to an end point 644 and back to the start point 642.

In the absence of any collision avoidance technology, the robots 610 and 630 would collide if both begin their tasks at the same time, as there is an obvious overlap of their operating envelopes around the area where the paths 620 and 640 cross. It is inefficient to simply program the robots so that one robot completes its task and then the other robot begins. Thus, there is a need for automatic velocity adjustment in the case of impending collision.

When the robot 610 is configured with the motion optimization/velocity modification system of FIG. 4, both robots begin to track their tool center point along their respective paths, and as the robot 610 approaches a point 626, the robot 610 detects the robot 630 (with its tool center at about a point 646) ahead in its path. The robot 610 thus slows and possibly stops with its tool center at around the point 626, while the robot 630 continues outbound and back along the path 640. When the robot 630 reaches about the point 646 on the return motion, the robot 610 resumes motion along the path 620 toward the end point 624. The net result is that robot collision is avoided, and the robot 610 can at least partially complete its task while the robot 630 is in its path. Other scenarios can easily be envisioned, where the timing is such that one robot simply has to slow down a little bit while the other robot clears the overlap area, and the disclosed the motion optimization/velocity modification technique maintains very high efficiency while preventing collisions. The scenarios outlined in FIG. 6 deal with robot-to-robot collisions. The disclosed velocity modification technique is equally adept and handling any other type of moving obstacle.

FIG. 4 showed a block diagram of the motion optimization/velocity modification system of the present disclosure at a high level, and the ensuing discussion described the details of the velocity modification calculations and the slowdown ratio feedback and usage to keep the actual path on the reference path. Two different detailed implementation embodiments are shown in the following figures, along with a method of determining when to trigger the collision avoidance velocity modification routine.

Figure 7:
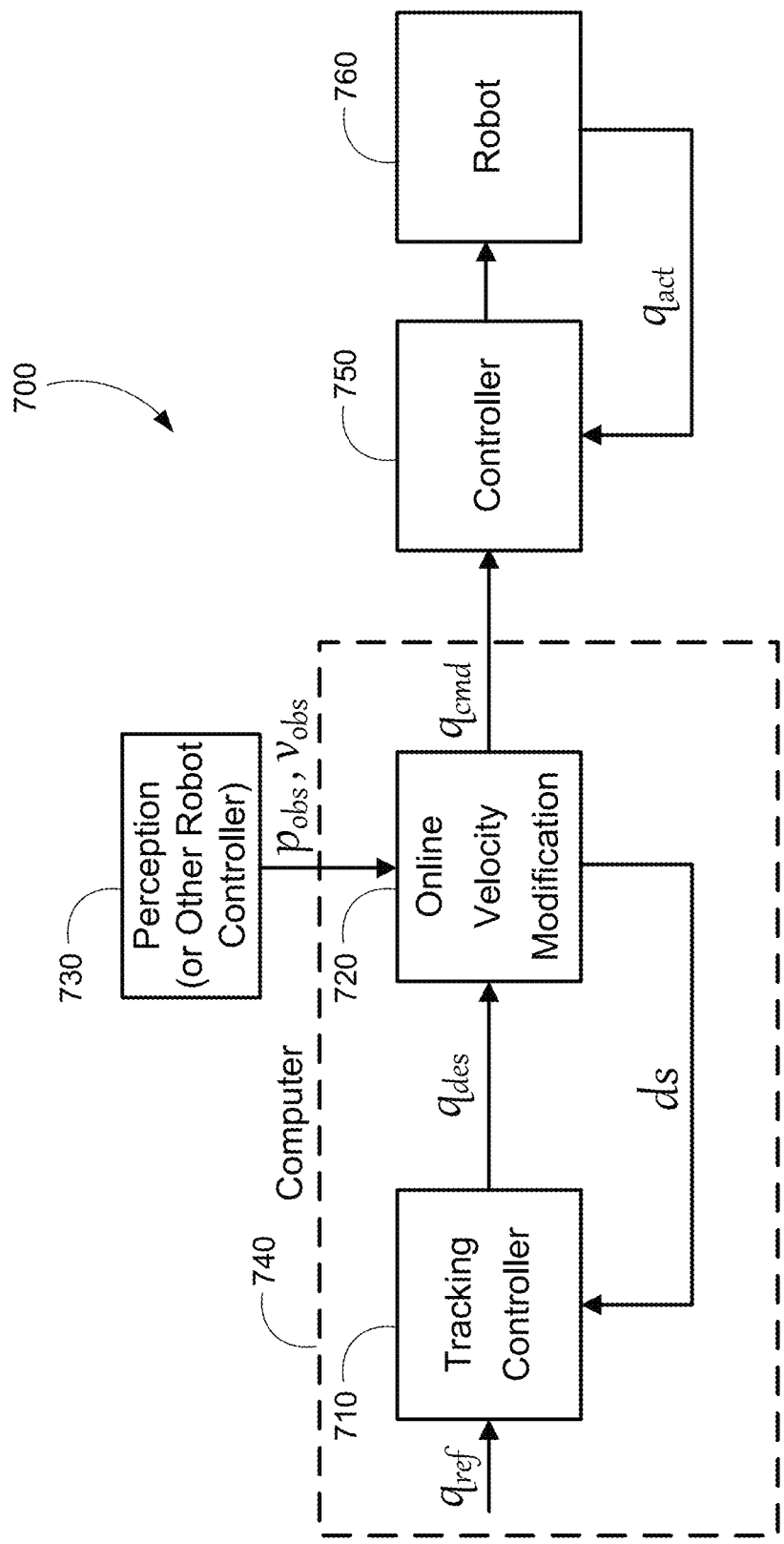
FIG. 7 is a block diagram illustration of a first implementation architecture of an online velocity modification control structure, according to an embodiment of the present disclosure.

FIG. 7 is a block diagram illustration of a first implementation architecture 700 of an online velocity modification control structure, according to an embodiment of the present disclosure. The architecture of FIG. 7 mirrors that of FIG. 4, where a tracking controller 710 computes desired robot joint position and velocity vectors, ($q_{des}$ and $\dot{q}_{des}$, where $\dot{q}_{des}$ is either provided directly or computed by differencing $q_{des}$ at current time step from previous time step) based on the reference path input $q_{ref}$, and provides the desired joint position and velocity vector data to an online velocity modification module 720. A perception module 730 (one or more sensors that can detect obstacle presence and movement—such as cameras, lidars, motion capture systems, or proximity sensors) provides obstacle position and velocity data ($p_{obs}$ and $v_{obs}$) for any obstacles found in the camera images or sensor data. Alternatively, in multi-robot systems, the obstacle data could be state data about another robot provided by that other robot's controller, as discussed further with respect to FIG. 8.

The online velocity modification module 720 computes an amount of velocity modification ("reduced speed limit") necessary based on any obstacles identified in the obstacle data. If no obstacles are present in the workspace, then the robot performs its task using the original planned motion path and velocity. The online velocity modification module 720 provides feedback of the slowdown ratio ds (0≤ds≤1) to the tracking controller 710, and the online velocity modification module 720 provides commanded robot joint positions and velocities ($q_{cmd}$ and $\dot{q}_{cmd}$) to a robot controller 750. In the architecture 700 of FIG. 7, the tracking controller 710 and the online velocity modification module 720 are implemented upstream of the controller 750, such as in a separate computer 740. The computer 740 could also perform some of the perception function—for example, the camera(s) could provide raw images to the computer 740, which would then process the images to determine the presence (and position and velocity) of any obstacles. The robot controller 750 provides joint motion commands to a robot 760, and the robot 760 provides joint position feedback $q_{act}$ from joint encoders back to the controller 750 so that the controller 750 knows the exact position of the robot joints at all times, as known in the art.

The architecture 700 of FIG. 7 has been implemented in simulations which confirm that the robot 760 operates at full planned speed in the absence of any workspace obstacles, slows down as necessary to avoid collisions with obstacles, and the tool center point faithfully tracks the reference path, even for curved paths when significant slowdowns are enforced.

Figure 8:
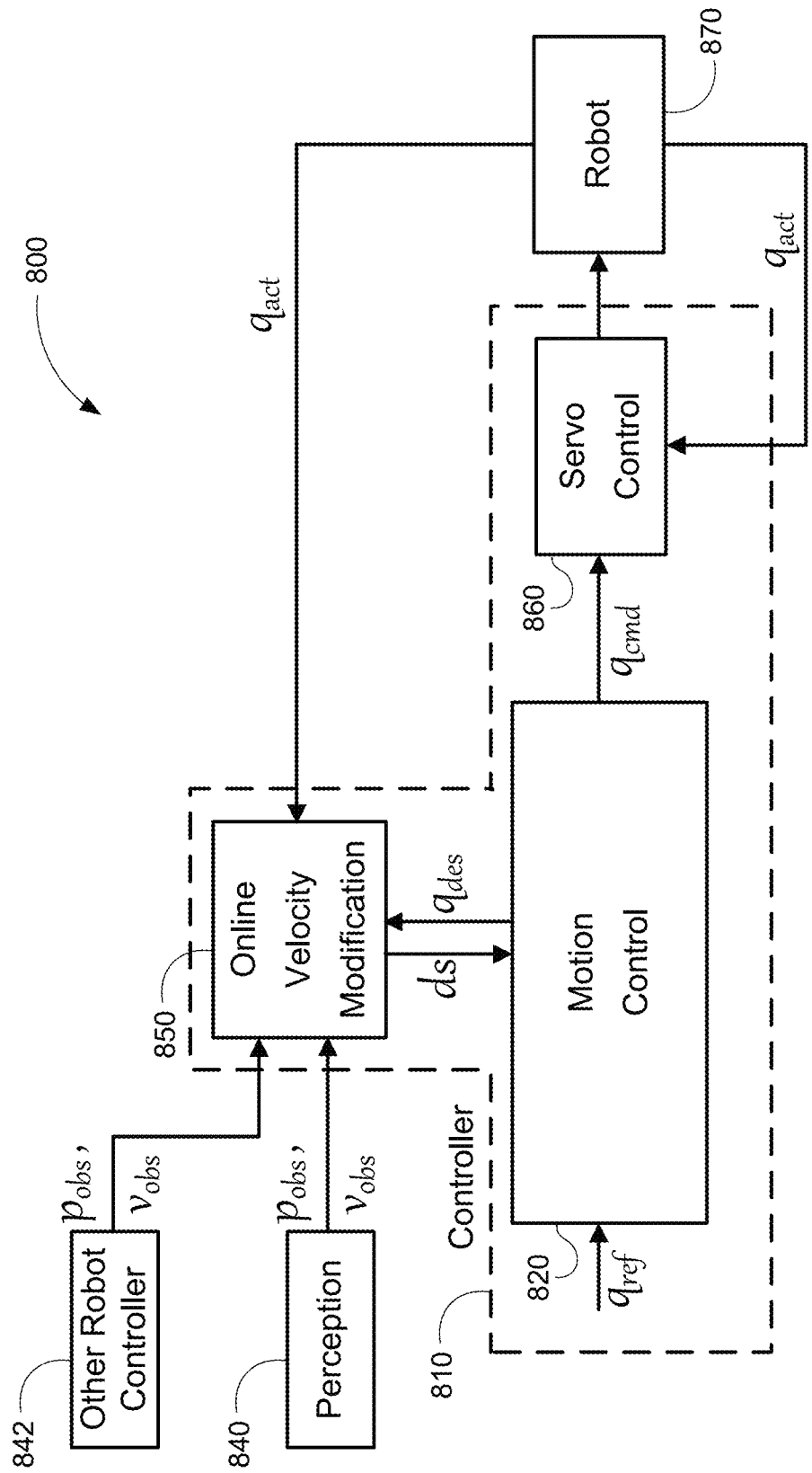
FIG. 8 is a block diagram illustration of a second implementation architecture of an online velocity modification control structure, according to an embodiment of the present disclosure.

FIG. 8 is a block diagram illustration of an architecture 800, a second implementation architecture of an online velocity modification control structure, according to an embodiment of the present disclosure. The architecture 800 of FIG. 8 is designed for straightforward implementation in existing robot controller systems. A robot controller 810 has a motion control module 820 which computes commanded robot joint motions, ($q_{cmd}$, and also $\dot{q}_{cmd}$ either directly or implicitly as discussed above) based on a reference path input $q_{ref}$. The motion control module 820 includes internal modules which perform computations required to provide the commanded robot joint motions ($q_{cmd}$), including computing an intermediate variable equivalent to the desired robot joint motions ($q_{des}$).

A perception module 840 (one or more sensors that can detect obstacle presence and movement—such as cameras, lidars, motion capture systems, or proximity sensors) provides obstacle position and velocity data ($p_{obs}$ and $v_{obs}$) for any obstacles found in the camera images or sensor data. Alternatively, as described above for the system of FIG. 7, the obstacle data could be state data about another robot provided by that other robot's controller 842. That is, in a multi-robot system such as shown in FIG. 6, each robot may be an obstacle to the other. Thus, in a multi-robot system, the perception module 840 may be eliminated (if no other obstacles are expected in the robot workspace), and instead each robot's position and velocity data provided to the other robot's controller to be used in computing obstacle data. The obstacle data (whether from the perception module 840 or from the other robot's controller 842, or both) is provided to an online velocity modification module 850 which computes an amount of velocity modification ("reduced speed limit") necessary based on any obstacles identified in the obstacle data. If no obstacles are present in the workspace, then the robot performs its task using the original planned motion path and velocity. The online velocity modification module 850 is preferably implemented on a processor within the robot controller 810 (dashed outline), as an additional software algorithm.

The online velocity modification module 850 receives the desired robot motions $q_{des}$ from the motion control module 820 and, along with the obstacle data, computes the slowdown ratio ds in the manner discussed previously. The online velocity modification module 850 provides the slowdown ratio ds (0≤ds≤1) to the motion control module 820 where it is used to compute the commanded robot motions $q_{cmd}$ which are revised from the desired robot motions $q_{des}$ if necessary based on any slowdown indicated in ds. The slowdown ratio ds is also used by the motion control module 820 to slow down the desired robot motions $q_{des}$ computed from $q_{ref}$ if necessary based on the value of ds. The motion control module 820 provides the commanded robot joint motions ($q_{cmd}$ and, either directly or implicitly, $\dot{q}_{cmd}$) to a servo control module 860, which is a known element of the controller 810. The servo control module 860 of the controller 810 provides joint motion commands to a robot 870, and the robot 870 provides joint position feedback $q_{act}$ from joint encoders back to the robot controller 810 so that the servo control module 860 knows the exact position of the robot joints at all times. The joint position feedback $q_{act}$ is also provided to the online velocity modification module 850, so that the online velocity modification module 850 knows the actual position and velocity of the robot 870 for computing robot-obstacle distance and relative velocity.

The architecture 800 of FIG. 8 has been implemented in an actual physical robot-controller system, with the online velocity modification module 850 programmed on a processor in the controller as described above. This prototype system exhibited the desired behavior—including the robot operating at full planned speed in the absence of any workspace obstacles, and the robot slowing down as necessary to avoid collisions with obstacles, while the tool center point faithfully tracked the reference path, even for curved paths when significant slowdowns were enforced. Experimental results are discussed further below.

The preceding discussion of FIGS. 4-8 describes how the online velocity modification module performs an optimization computation to determine a robot slowdown ratio based on the presence of workspace obstacles, and how the slowdown ratio ds is used to modify robot velocity if necessary while faithfully following the planned reference path of the tool center. An additional aspect of the present disclosure is a technique for determining when to "turn on" the velocity modification optimization computation, so that the online velocity modification computation is not performed in situations when robot-obstacle conflicts are not likely or possible.

Figure 9:
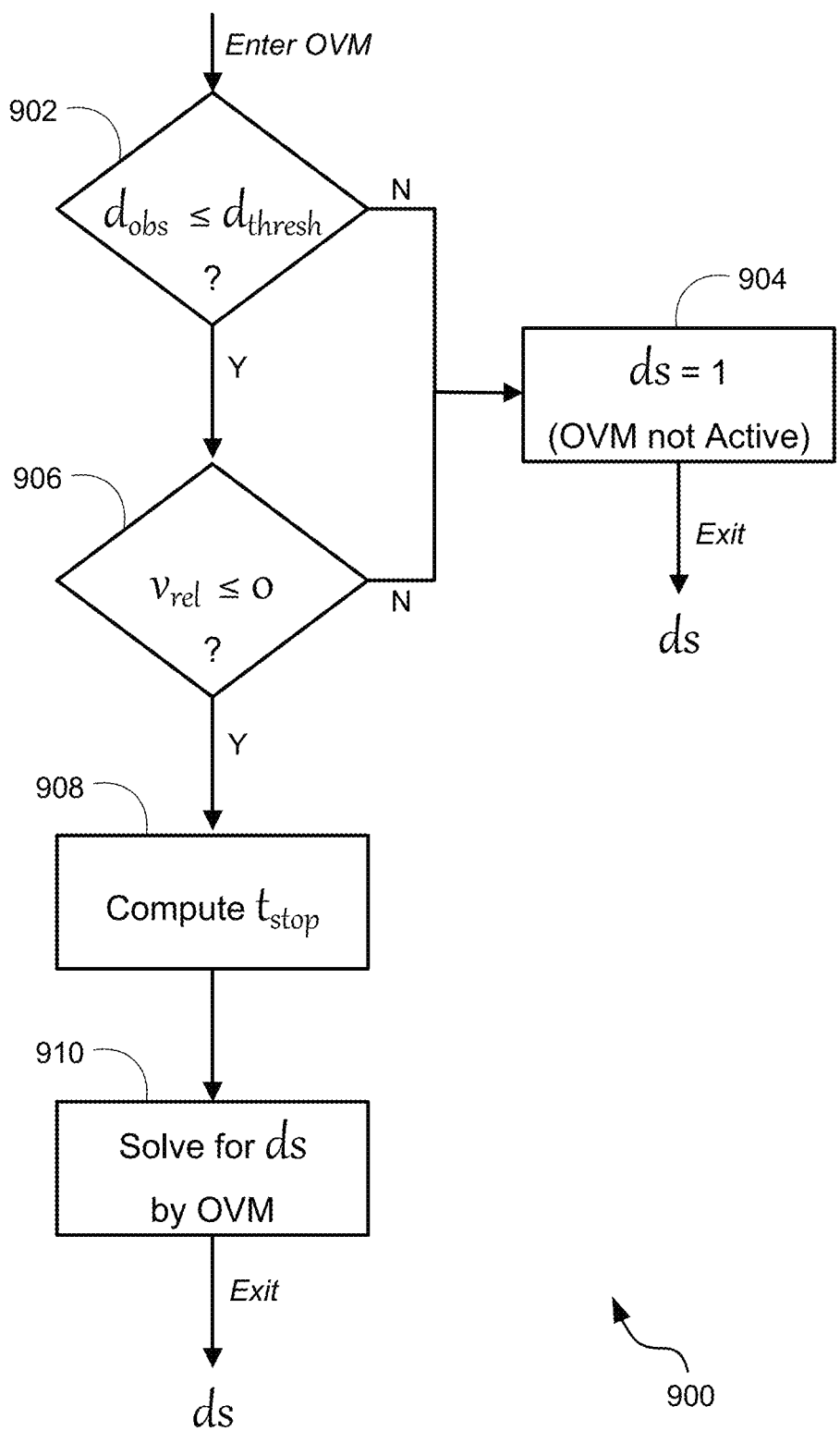
FIG. 9 is a flowchart diagram of a method for triggering the online velocity modification calculation based on robot-obstacle distance and relative velocity, according to an embodiment of the present disclosure.

FIG. 9 is a flowchart diagram 900 of a method for triggering the online velocity modification calculation based on robot-obstacle distance and relative velocity, according to an embodiment of the present disclosure. In the method of FIG. 9, both robot-obstacle distance (minimum distance between the obstacle and any part of the robot) and robot-obstacle relative velocity (rate of change of minimum distance) are evaluated, and the velocity modification calculations are performed only when both the distance and velocity meet predefined criteria. The method of FIG. 9 is performed in the online velocity modification module 720 of FIG. 7 or the online velocity modification module 850 of FIG. 8.

Upon entering the online velocity modification (OVM) module, at decision diamond 902, it is determined whether the current robot-obstacle minimum distance $d_{obs}$ is less than or equal to a predetermined threshold distance $d_{thresh}$. The threshold distance can be defined based on robot maximum working speed and other factors, such as whether people may be present within the workspace. If the current robot-obstacle minimum distance is greater than the threshold distance, then the process moves to box 904 where the slowdown ratio is set to ds=1 and the OVM optimization calculations are not performed. If the current robot-obstacle minimum distance is less than or equal to the threshold distance at the decision diamond 902, then the process moves to decision diamond 906.

At the decision diamond 906, it is determined whether the relative velocity $v_{rel}$ of the obstacle with respect to the robot is less than or equal to zero. The robot-obstacle relative velocity can be determined from the rate of change of the minimum robot-obstacle distance from one time step to the next. If the robot-obstacle relative velocity is greater than zero, this means that the obstacle is moving away from the robot (or the robot is moving away from the obstacle, or a combination of the two), and because the distance is increasing, a collision is not possible under the current conditions. When the robot-obstacle relative velocity is greater than zero, the process moves to the box 904 where the slowdown ratio is set to ds=1 and the OVM calculations are not performed.

If the robot-obstacle relative velocity is less than or equal to zero (and the distance is less than the threshold from the decision diamond 902), then at box 908 the robot stopping time $t_{stop}$ is computed based on robot-obstacle distance as follows:

$$t_{stop} = \min\left(\frac{d_{obs}}{|v_{rel}|}, \frac{d_{obs}}{|v_{safe}|}\right) \quad (9)$$

Where $v_{safe}$ is a speed magnitude which is used to avoid a numerical error when $v_{rel}=0$.

The stopping time $t_{stop}$ is then used in Equation (5) to determine a joint velocity limit as discussed above. The online velocity modification optimization computations are then performed at box 910 using Equations (6)-(8) as discussed above, resulting in a slowdown ratio having a value 0≤ds≤1. The online velocity modification module exits either from the box 904 (ds=1) or from the box 910 (value of ds computed).

It is known in the art to perform robot collision avoidance computations only when workspace obstacles are within a certain distance of the robot. However, by evaluating the robot-obstacle relative velocity along with the minimum distance as shown in FIG. 9, the presently disclosed technique avoids performing the computations and potentially slowing down the robot in situations where the obstacle is moving away from the robot (and/or the robot is moving away from the obstacle), when a collision is not possible even though the robot-obstacle distance may be small.

Many simulations and real world experiments have been performed which validate the effectiveness of the online velocity modification techniques discussed above. The simulations include multi-robot workspace scenarios such as the one shown in FIG. 6, and the real world experiments include a human and a hand-held obstacle moving around the workspace of a robot which is programmed to follow both linear and curved path segments. In all cases, data analysis shows that a slowdown (ds<1) is commanded only when the robot-obstacle distance is less than the threshold and the robot-obstacle relative velocity is decreasing, the value of the slowdown ratio from the online velocity modification calculations is as expected based on robot-obstacle distance, and the actual tool center point path follows the reference tool center point path even in curved portions of the path when the robot slows down in response to ds<1. Several examples of the simulation and experimental results are shown in later figures and discussed below.

In the earlier discussion of FIG. 6, it was described how collisions are prevented in a two-robot system with intersecting paths when the online velocity modification technique is implemented in one of the robots. It is preferable to implement the online velocity modification technique in all robots of a multi-robot system, so that overall efficiency can be maximized (number and duration of slowdowns minimized). However, in order to do this, a robot priority or precedence order must be established in real time based on workspace conditions, and a sequential process of calculating the slowdown ratio ds for each robot in priority order must be followed. This technique is discussed below.

When two or more robots are operating in a shared workspace with the operational envelopes of the robots overlapping, it is possible that collisions could occur. Such collisions can be avoided by pre-programming the robots to strictly follow a synchronized sequence of movements which prevents two robots from being in the same place at the same time. However, some types of tasks dictate that each of the robots operates at its own pace, which prevents a strict synchronization of movements. In such cases, a potential overlap region can be identified, and the distance of each robot from the overlap region (at a current time step or robot control cycle) can be used to establish a priority order. This technique is described below.

Figure 10:
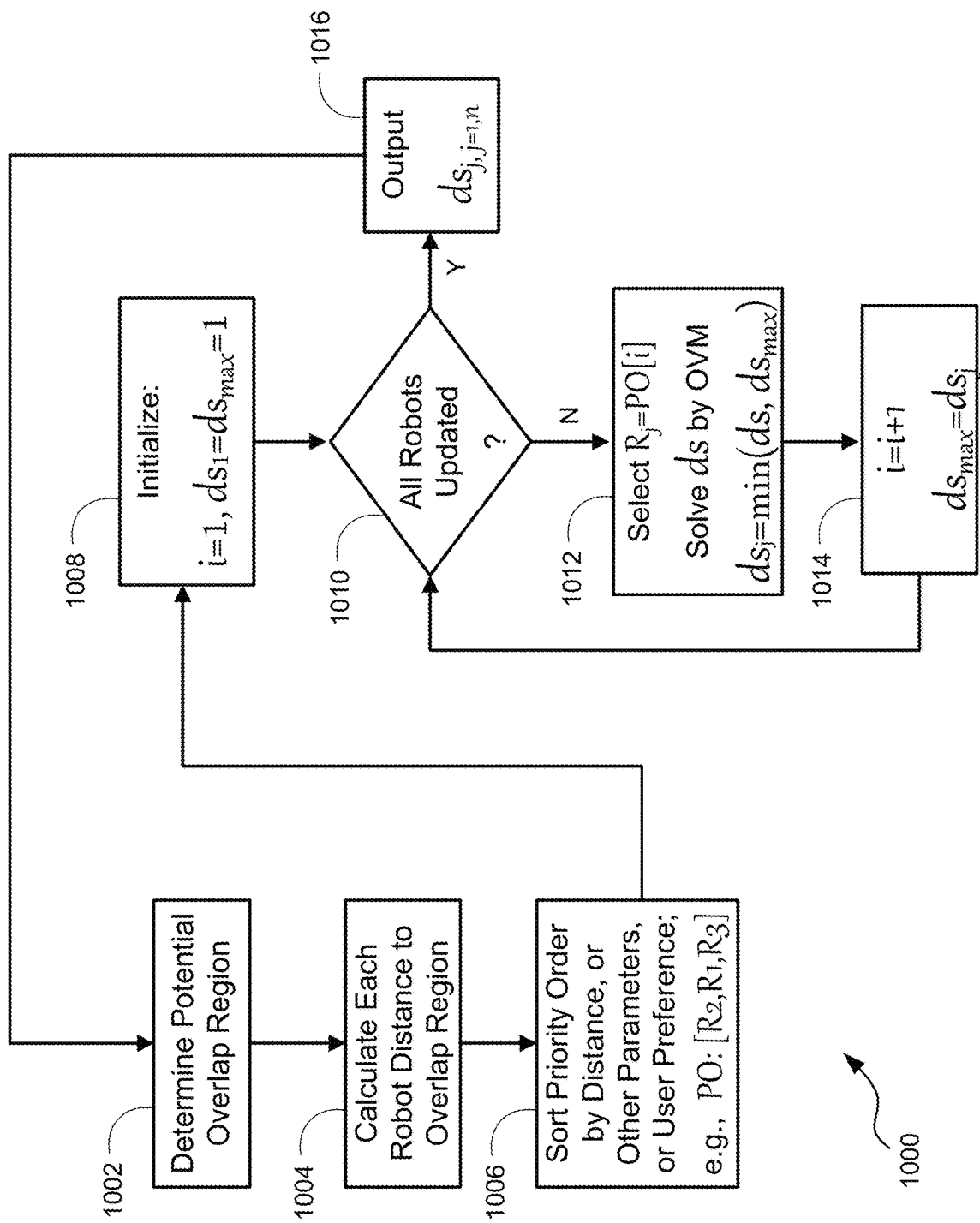
FIG. 10 is a flowchart diagram of a method for establishing priority of each robot in a multi-robot system, and performing the online velocity modification calculation based on the priority, according to an embodiment of the present disclosure.
Figure 12:
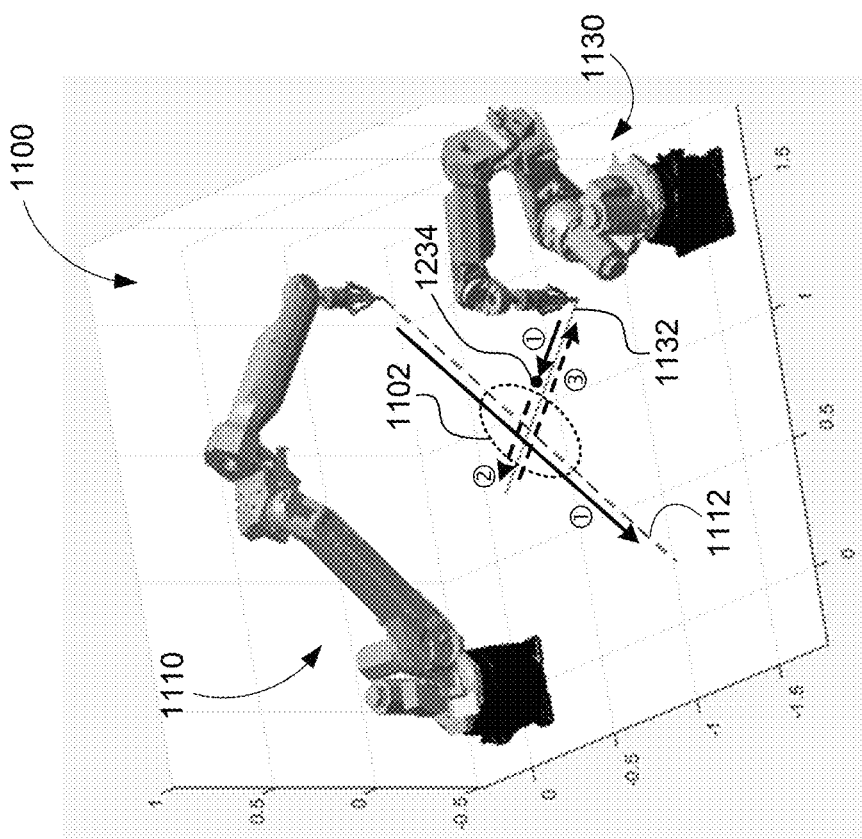
FIG. 12 is an illustration of the two-robot system of FIG. 11, with simulation results showing how the OVM priority logic of FIG. 10 affects a second motion scenario, according to an embodiment of the present disclosure.
Figure 11:
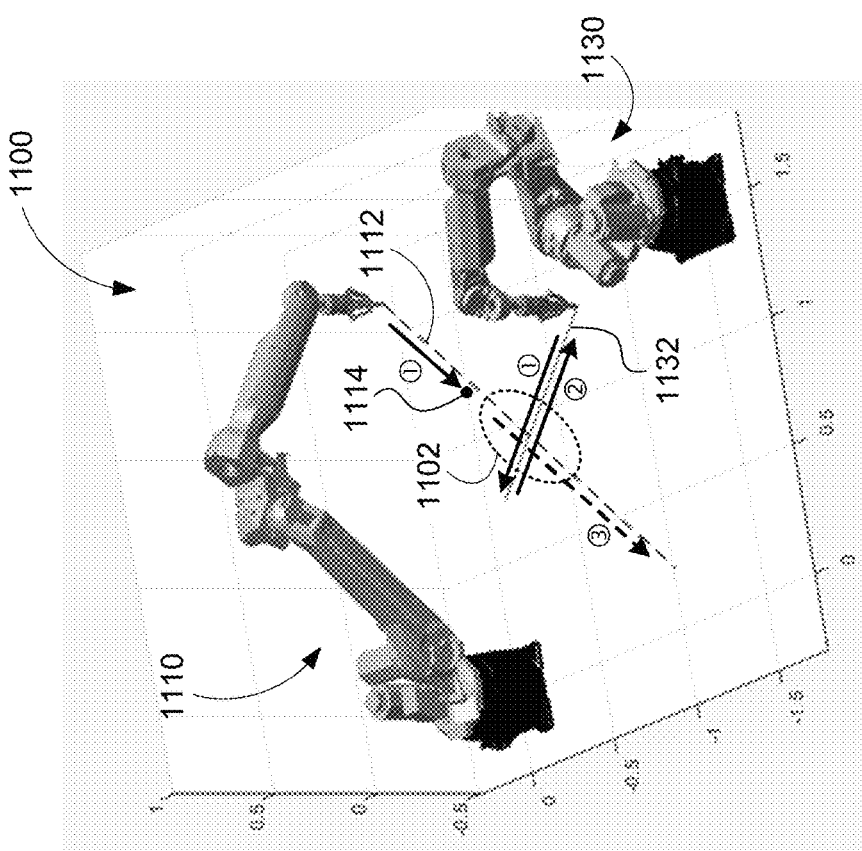
FIG. 11 is an illustration of a two-robot system with intersecting paths, with simulation results showing how the OVM priority logic of FIG. 10 affects a first motion scenario, according to an embodiment of the present disclosure.

FIG. 10 is a flowchart diagram 1000 of a method for establishing priority of each robot in a multi-robot system, and performing the online velocity modification calculation based on the priority, according to an embodiment of the present disclosure. FIG. 11 is an illustration of a two-robot system 1100 with intersecting paths, with simulation results showing how the OVM priority logic of FIG. 10 affects a first motion scenario, according to an embodiment of the present disclosure. FIG. 12 is an illustration of the two-robot system 1100, with simulation results showing how the OVM priority logic of FIG. 10 affects a second motion scenario, according to an embodiment of the present disclosure.

The process begins for a particular time step (robot control cycle) at box 1002, where a potential overlap region of robot motion is identified. In a workspace 1100 of FIG. 11, an overlap region 1102 is identified involving a robot 1110 and a robot 1130. The overlap region may be a two-dimensional area (in top view, for example), or the overlap region may be a three-dimensional volume. At box 1004, a distance from each robot's current position to the overlap region is calculated. The distance calculation may be formulated to correspond with the nature of the overlap region. For example, the distance could be calculated as the distance a robot's tool center point has to travel in order to enter the 2D overlap region projected vertically. Or the distance could be calculated as an actual 3D distance for any part of a robot to enter a 3D overlap volume. These calculations can be defined to suit a particular application.

At box 1006, a priority order for the robots in the system is defined by sorting the robots based on distance (in one embodiment) from the overlap region—where the robot closest to the overlap region has top/highest priority (1), and the robot furthest from the overlap region has the lowest priority. The idea behind this priority sorting is to allow the closest robot to pass through the overlap region as quickly as possible, while the other robots pass through the overlap region in succession. In many cases, it is possible that the top priority robot will not have to slow down at all, and successive robots may only have to slow down a small amount.

In an alternate embodiment, instead of distance to the overlap region, a time to reach the overlap region for each robot may be calculated at the box 1004, and the time value used to establish robot priority order at the box 1006. Time, rather than distance, may be used in applications where one robot in the system has a planned speed or path length which is much different than one or more other robots in the system. In still other embodiments, acceleration/deceleration capability of the robots may be considered in determining priority, where a robot with the least acceleration/deceleration capability (such as a largest robot with greatest inertia) may be assigned the highest priority. Other factors may also be considered, and the priority may in fact be assigned based on user preference, or using a user-defined formula including constants (such as robot capabilities) and variables (such as a distance to overlap region at a particular control cycle).

The output of the box 1006 is a priority order of the robots for the particular robot control cycle which is currently being evaluated. In FIG. 11, by way of example, it may be that the robot 1130 has highest priority and the robot 1110 has lowest priority. For the following discussion, a 3-robot system is used as an example, and the priority order for the 3-robot system is assumed to be PO=[$R_2$, $R_1$, $R_3$], which indicates that the robot $R_2$ has highest priority (1), the robot $R_1$ has second-highest priority (2), and the robot $R_3$ has lowest priority (3). Again, these priorities only apply to a particular portion of the robots' operations; at a later time, the priority order may be entirely different based on conditions at that time.

Still continuing for the particular robot control cycle, calculations of the slowdown ratio for each robot begin at box 1008 with an initiation, where a priority order counter is initialized (i=1), and preliminary slowdown ratio values are set ($ds_1=ds_{max}=1$). That is, the slowdown ratio ds for the robot having priority 1 (robot $R_2$) is set to a preliminary value of one, and a parameter $ds_{max}$ is also set to a value of one.

At decision diamond 1010, it is determined whether all robots (all three in this example) have had their ds value calculated. If not, then at box 1012, the robot is selected which has the priority order of the current priority order counter, which is robot $R_2$ because the counter is still i=1. The slowdown ratio ds is then computed for $R_2$ using the OVM calculations discussed above (evaluate robot-obstacle distance and velocity, then compute ds from $t_{stop}$ and optimization computation). Even though the robot $R_2$ has the highest priority, ds is still computed, because there may be other obstacles requiring that the robot $R_2$ slow down. The ds value for $R_2$ is then set as the minimum of the value just computed by OVM and the previously-set value of $ds_{max}$. That is, for robot $R_2$, $ds_2=\min(ds, ds_{max})$. For the highest priority robot ($R_2$), $ds_{max}=1$ was previously set at the box 1008. Therefore, $ds_2$ will be equal to the value of ds just computed by OVM, which could be as high as ds=1.

In the preceding discussion of the box 1012, the value of ds was computed for the highest priority (i=1) robot $R_2$. Then at box 1014, the counter value is incremented (i=i+1), and the maximum possible value of ds for the next priority robot is set to the ds value for the robot just calculated. That is, $ds_{max}=ds_j$, which establishes that each robot in descending priority order can have a ds value which is no higher than that of the robot having immediately higher priority. The process then loops back to the decision diamond 1010, where it is determined whether all robots' ds values have been updated.

Continuing with the 3-robot system example, only the top priority robot $R_2$ has been computed thus far. The process therefore continues to the box 1012, where robot having priority i=2 is now selected (from the priority order established at the box 1006), which is robot $R_1$. The value of $ds_1$ is then computed for the robot $R_1$, and can be no higher than the value $ds_{max}$ established for the previous robot ($ds_2$). At the box 1014, the priority order counter is again incremented (i=i+1), and the maximum possible value of ds for the next priority robot is set to the ds value for the robot just calculated.

The process then loops back to the decision diamond 1010, and proceeds to the box 1012 where ds is calculated for the next lower priority (i=3) robot $R_3$. When the process again loops back to the decision diamond 1010, it is determined that all three robots have had a ds value calculated for the current control cycle, and at box 1016 the values of $ds_j$ for all robots ($ds_2$ for top priority robot $R_2$; $ds_1$ for second priority robot $R_1$; etc.) are output for usage as discussed above (feedback to the tracking controller for each robot, or usage by the interpolation module). The process then loops back to the box 1002 for the next control cycle.

FIG. 11 depicts the robot 1110 having a one-way planned path 1112, and the robot 1130 having a two-way (outbound and return) planned path 1132. In FIG. 11, the scenario is that the robot 1130 takes highest priority by virtue of being nearest to or soonest to arrive at the overlap region 1102. Therefore, the first thing that happens is that the robot 1110 begins moving along its planned path 1112 and the robot 1130 begins moving along its planned path 1132. These movements happen simultaneously, and are both depicted with an arrow labelled ① indicating that they happen first. When the robot 1110 (which is lower priority) nears a point 1114, the robot 1110 must slow down, and may stop near the point 1114 to allow the higher priority robot 1130 to complete its outbound path (arrow ①) and its return path (arrow ②). When the robot 1130 has nearly completed its return path (arrow ②), such that the robot 1130 is out of the way of the robot 1110 and/or is moving away from the robot 1110, only then can the robot 1110 complete its path as indicated by the dashed arrow ③.

FIG. 12 depicts the same workspace 1100 with the robots 1110 and 1130 having the same planned paths (1112 and 1132, respectively) and the same overlap region 1102, as in FIG. 11. In FIG. 12, the scenario is that the robot 1110 takes highest priority by virtue of being nearest to or soonest to arrive at the overlap region 1102. Therefore, the first thing that happens is that the robot 1110 begins moving along its planned path 1112 and the robot 1130 begins moving along its planned path 1132. These movements happen simultaneously, and are both depicted with an arrow labelled ① indicating that they happen first. The robot 1110 completes the entire planned path 1112 without interruption, because it is highest in priority. Meanwhile, when the robot 1130 (which is lower priority) nears a point 1234, the robot 1130 must slow down, and may stop near the point 1234 to allow the higher priority robot 1110 to pass through the overlap region 1102. When the robot 1110 has nearly completed its path (arrow ①), such that the robot 1110 is out of the way of the robot 1130 and/or is moving away from the robot 1130, only then can the robot 1130 complete its outbound path (dashed arrow ②) and then its return path (arrow ③).

The robots 1110 and 1130 of FIGS. 11-12 may be operating independently of one another, such that their motions cannot be permanently synchronized for each task. This would be the case when the robots are performing tasks which depend on the availability of inbound parts, or depend on the status of another machine, for example. This situation makes the presently disclosed techniques—adaptively determining robot priority in real time, and performing velocity modification as necessary to prevent collisions—extremely beneficial.

Figure 13:
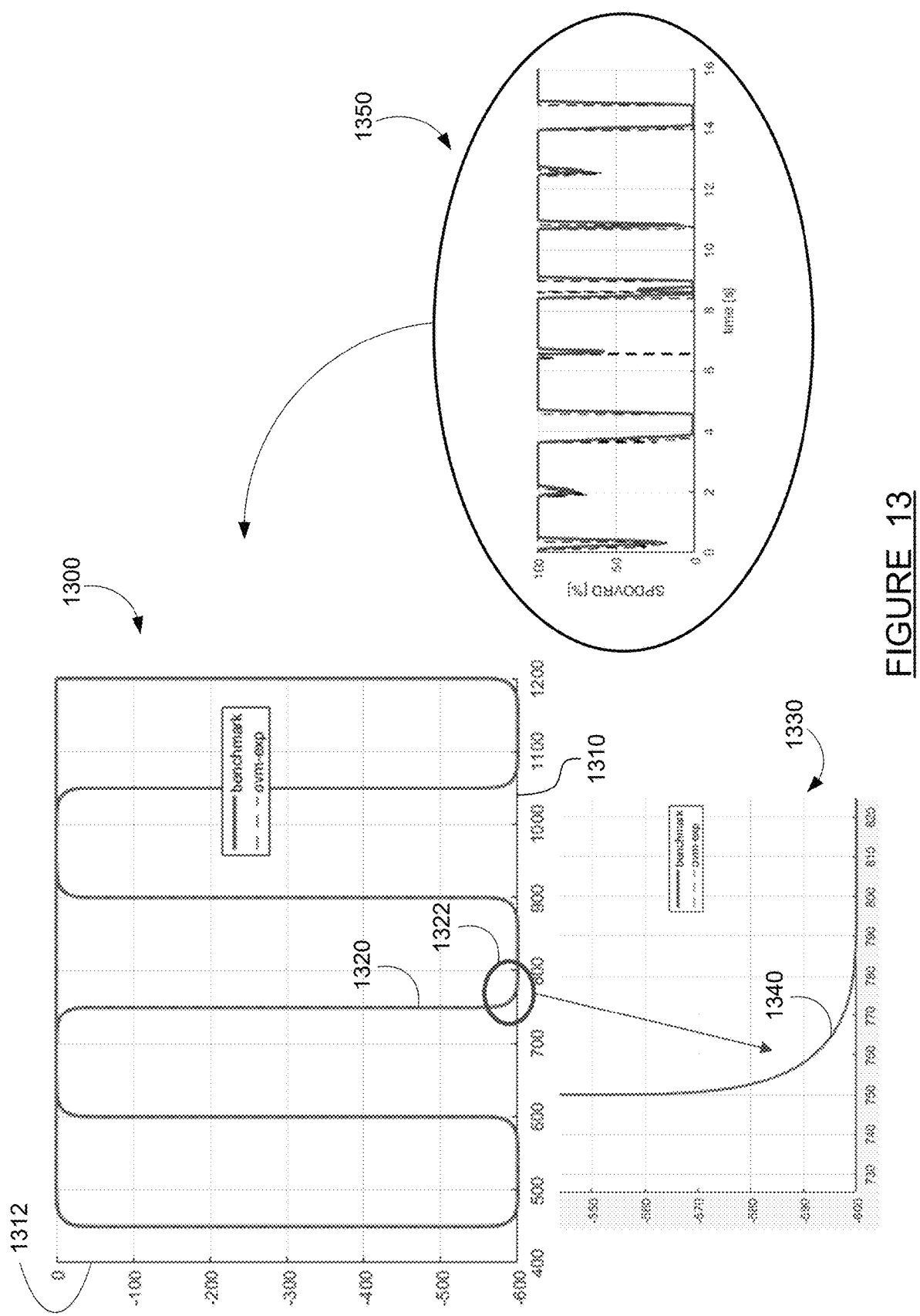
FIG. 13 is a graph of an actual tool center point path superimposed on a reference path, depicting how the actual tool center point path follows the reference path, even in tight curves and when the robot velocity is reduced to avoid obstacles, according to an embodiment of the present disclosure.

FIG. 13 is a graph 1300 of an actual tool center point path superimposed on a reference path, depicting how the actual tool center point path follows the reference path, even in tight curves and when the robot velocity is reduced to avoid obstacles, according to an embodiment of the present disclosure. The data plotted on the graph 1300 is from physical experiments conducted using the online velocity modification techniques discussed above, programmed onto a robot controller controlling a robot as in FIG. 8.

The graph 1300 represents a workspace having an x dimension on a horizontal axis 1310 and a y dimension on a vertical axis 1312. The units of the axes 1310 and 1312 are in millimeters (mm). The z dimension is not shown and is not significant to the discussion, as the robot in the experiment was programmed for the tool center point to follow a sort of zig-zag shape in an x-y plane, where the shape moves back and forth in the y direction a few times while steadily moving in the x direction, then looping back around to the starting point. This tool center point path is depicted by a trace 1320, which is both the actual tool center point path and the reference (programmed) path; the actual and reference paths are so identical that they cannot be distinguished in the graph 1300.

Even when zooming in to one of the corners of the path, as in a second graph 1330, the actual and reference paths are indistinguishable in a trace 1340, where the trace 1340 is the portion of the trace 1320 indicated in oval 1322. The high fidelity path following is true even though significant and repeated robot slowdowns were commanded by the online velocity modification module during the robot motions. A third graph 1350 shows the speed override percentage (the slowdown ratio ds converted to a percentage) vs. time for the duration of the path tracing of the graphs 1300 and 1330. The slowdowns and stops for collision avoidance are readily apparent on the graph 1350. The dashed trace on the graph 1350 indicates the value of the speed override percentage (which is the slowdown ratio ds converted to a percentage) as computed by the OVM module, while the solid trace indicates the value of the speed override percentage after being passed through a low-pass filter.

Taken together, the graphs on FIG. 13 illustrate that the online velocity modification techniques of the present disclosure are highly effective at maintaining a programmed (reference) tool center point path, while attenuating robot speed as necessary to avoid close encounters with workspace obstacles.

Figure 14:
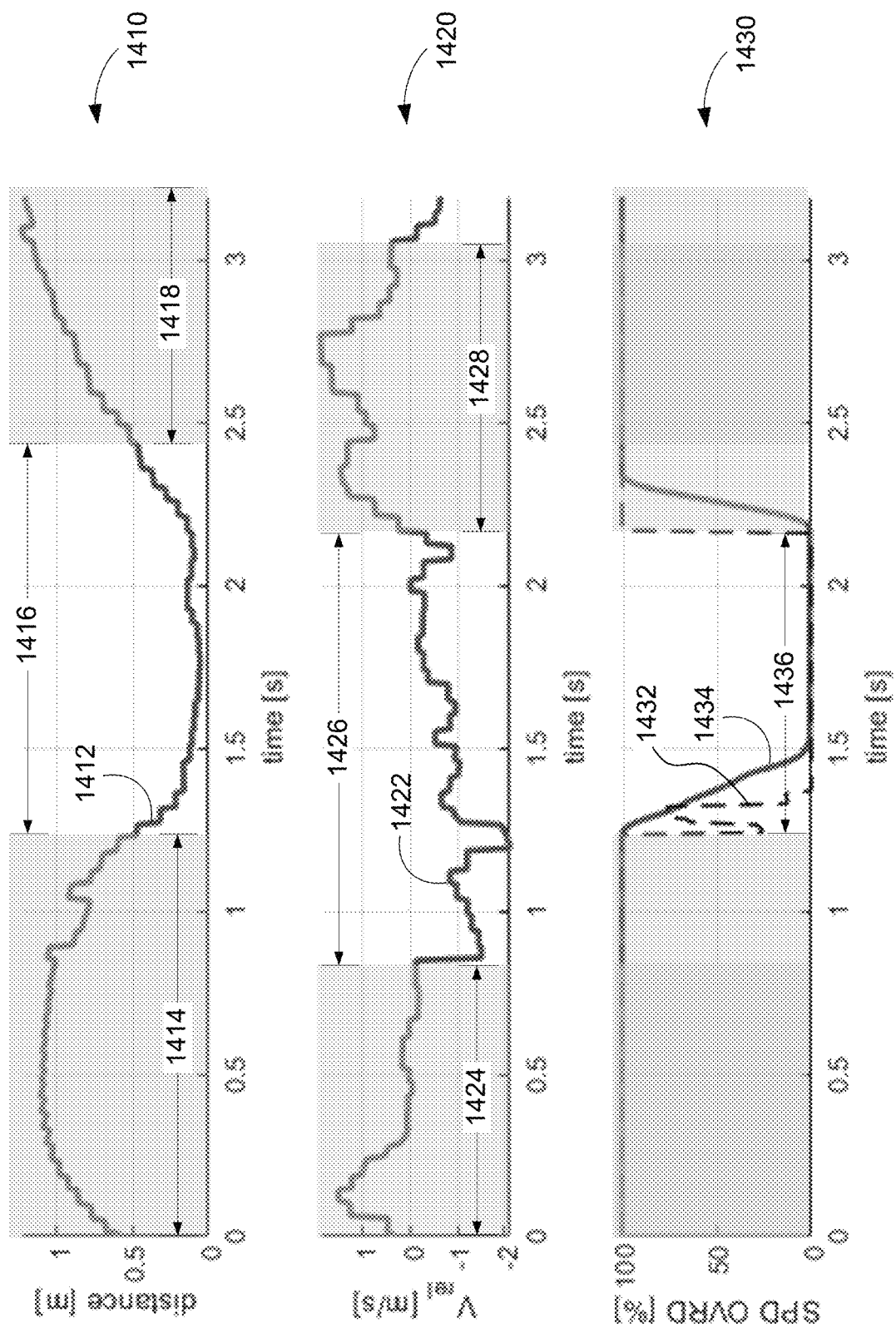
FIG. 14 is a graph set plotting robot-obstacle distance and relative velocity vs. time, and also showing the resultant OVM speed override percentage, or slowdown ratio, according to an embodiment of the present disclosure.

FIG. 14 is a graph set plotting robot-obstacle distance and relative velocity vs. time, and also showing the resultant OVM speed override percentage, or slowdown ratio, according to an embodiment of the present disclosure. A graph 1410 plots minimum robot-obstacle distance vs. time. A curve 1412 indicates the value of the minimum distance as it increases, decreases and increases again during a portion of an experiment using an actual robot and controller programmed with the online velocity modification technique. In a shaded section 1414 of the graph 1410, the minimum robot-obstacle distance is greater than the minimum distance threshold (0.5 m) which was used as a trigger for the online velocity modification calculation as shown in FIG. 9. In a section 1416, the minimum robot-obstacle distance is less than the minimum distance threshold. In a shaded section 1418, the minimum robot-obstacle distance is again greater than the minimum distance threshold. Thus, in the shaded sections 1414 and 1418, the minimum robot-obstacle distance indicates that the online velocity modification calculation does not need to be performed.

A graph 1420 plots robot-obstacle relative velocity vs. time. A curve 1422 indicates the value of the relative velocity as it varies throughout a portion of the experiment using the actual robot and controller programmed with the online velocity modification technique. The graph 1420 plots data from the same experimental trial as the graph 1410, on the same time scale. In a shaded section 1424 of the graph 1420, the robot-obstacle relative velocity is greater than zero. In a section 1426, the robot-obstacle relative velocity is less than zero. In a shaded section 1428, the robot-obstacle relative velocity is again greater than zero. Thus, again referring to the method of FIG. 9, in the shaded sections 1424 and 1428, the robot-obstacle relative velocity indicates that the online velocity modification calculation does not need to be performed.

The curve 1412 on the graph 1410, and the curve 1422 on the graph 1420, both exhibit what is known as zero order hold signal behavior. This is where the curves take a small horizontal step from one data point to the next. The reason for this behavior is that the robot system runs at higher frequency than the perception system (e.g., cameras). Hence, when the robot system (such as the controller 750 of FIG. 7, or the controller 810 of FIG. 8) computes new robot commands for a time step, but the camera did not provide an updated frame (no new obstacle data), the robot system treats the obstacle as being at the same position and the same velocity as in the previous time step. This phenomenon does not adversely affect robot system performance when using the online velocity modification techniques.

A graph 1430 plots OVM speed override percentage vs. time. The graph 1430 plots data from the same experimental trial as the graphs 1410 and 1420, on the same time scale. A dashed curve 1432 indicates the value of the speed override percentage (which is the slowdown ratio ds converted to a percentage), as computed by the OVM module, as it varies throughout a portion of the experiment. A solid curve 1434 indicates the value of the speed override percentage after being passed through a low-pass filter. The low-pass filter is used to remove jerky characteristics of the speed override percentage which may appear under certain conditions, as observed at about 1.25 seconds on the graph 1430. A section 1436 of the graph 1430 corresponds to a time period where the online velocity modification calculations are indicated by both the minimum distance graph 1410 (the section 1416) and the relative velocity graph 1420 (the section 1426). Thus, in the section 1436, where the robot-obstacle minimum distance is less than the threshold and the relative velocity is less than zero, the slowdown ratio ds is computed and has a value less than one. The low-pass filtered version of the ds signal (the curve 1434) is provided to the motion system in the robot controller to slow down or stop the robot, providing the desired robot-obstacle collision avoidance behavior.

The graphs of FIG. 14 clearly show that the online velocity modification technique of the present disclosure is effective in commanding a robot slowdown (or stop) only as needed based on obstacle conditions in the workspace, including both robot-obstacle minimum distance and relative velocity conditions. These results were obtained and observed in experiments with a human manipulating an object in the workspace with the robot, where the robot controller was programmed with the online velocity modification techniques as shown in FIG. 8.

Throughout the preceding discussion, various computers and controllers are described and implied. It is to be understood that the software applications and modules of these computers and controllers are executed on one or more electronic computing devices having a processor and a memory module. In particular, this includes a processor in each of the robot controller 750 and the separate computer 740 of FIG. 7, and the controller 810 of FIG. 8, along with the perception systems, as discussed above. Specifically, the processors in the controllers and the separate computer are configured to perform the online velocity modification computations for robot-obstacle collision avoidance described in detail above, including the technique for determining whether to activate the online velocity modification calculation, and the technique for determining a priority order for multi-robot systems.

While a number of exemplary aspects and embodiments of the methods and systems for robotic system dynamic velocity modification have been discussed above, those of skill in the art will recognize modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method for adaptive robot velocity modification, said method executed on one or more computing devices and comprising:
providing a robot reference path which defines a robot movement for a task to be performed by the robot;
providing obstacle data characterizing obstacles in a robot workspace;
performing a robot velocity modification calculation when indicated by the obstacle data, including determining a joint speed limit for each joint in the robot, and calculating a robot slowdown ratio as a minimum value, among all of the joints, of the joint speed limit divided by a maximum speed for each joint;
computing a commanded robot motion using the robot slowdown ratio and a desired robot motion;
using the robot slowdown ratio to compute a new position along the robot reference path, and using the new position along the robot reference path to compute the desired robot motion for a next robot control cycle; and
providing the commanded robot motion to a controller module which controls motions of the robot.

2. The method according to claim 1 wherein the desired robot motion and the commanded robot motion are vectors including a value for each of the joints in robot joint coordinates, and the robot reference path is either a tool center point path defined in Cartesian space or a robot motion defined in joint space.

3. The method according to claim 1 wherein performing a robot velocity modification calculation when indicated by the obstacle data includes performing the robot velocity modification calculation only when a robot-obstacle minimum distance is less than a predetermined threshold and simultaneously a robot-obstacle relative velocity is less than zero.

4. The method according to claim 1 wherein performing a robot velocity modification calculation includes performing an optimization computation having an objective function which minimizes deviation of a computed robot motion from the desired robot motion and an inequality constraint which dictates that a magnitude of a computed joint speed is less than or equal to the joint speed limit for each joint in the robot.

5. The method according to claim 1 wherein the joint speed limit for each joint in the robot is computed using an equation including a robot stop time and predefined maximum values of robot joint velocity, acceleration and jerk, and the joint speed limit for each joint is defined to have a minimum value of zero.

6. The method according to claim 5 wherein the robot stop time is computed as a function of the obstacle data and robot capability data.

7. The method according to claim 1 wherein providing obstacle data includes providing the obstacle data by a perception system including one or more cameras or sensors configured to detect any obstacle in the workspace.

8. The method according to claim 1 wherein the method for adaptive robot velocity modification is used by two or more robots having overlapping motion envelopes in the robot workspace, where each robot's controller communicates its state data to all other robot controllers to be used as the obstacle data, and where each of the robots is assigned a priority order for its velocity modification calculations at each robot control cycle.

9. The method according to claim 8 wherein the priority order is assigned based on a distance of each of the robots from a path overlap area, where a smaller distance to the overlap area corresponds to a higher priority, or the priority order is assigned based on acceleration/deceleration capability of the robots, or the priority order is assigned based on a user-defined preference.

10. The method according to claim 8 wherein the robot velocity modification calculation is performed for each of the robots in sequence, in descending priority order beginning with a highest priority robot, and where a value of the robot slowdown ratio for each robot is capped to be less than or equal to the value of the robot slowdown ratio for an immediately higher priority robot.

11. The method according to claim 1 wherein the robot velocity modification calculation is performed by a processor in a computer, where the robot slowdown ratio is provided as feedback to a tracking module running on the computer which computes the desired robot motion for the next robot control cycle, and the commanded robot motion is provided from the computer to a robot controller which performs closed-loop feedback control of the motions of the robot.

12. The method according to claim 1 wherein the robot velocity modification calculation is performed by a processor in a robot controller, where the robot slowdown ratio is provided to a motion system running on the robot controller, where the motion system computes the desired robot motion for the next robot control cycle using the robot slowdown ratio, and the motion system computes the commanded robot motion using the robot slowdown ratio and the desired robot motion and provides the commanded robot motion to a servo control module of the robot controller which performs closed-loop feedback control of the motions of the robot.

13. A method for adaptive robot velocity modification, said method executed on one or more computing devices and comprising:
providing a robot reference path which defines a robot movement for a task to be performed by the robot;
providing obstacle data characterizing obstacles in a robot workspace;
performing a robot velocity modification calculation when indicated by the obstacle data, including determining a joint speed limit for each joint in the robot, and calculating a robot slowdown ratio as a minimum value, among all of the joints, of the joint speed limit divided by a maximum speed for each joint, where the robot velocity modification calculation includes an optimization computation having an objective function which minimizes deviation of a computed robot motion from a desired robot motion and an inequality constraint which dictates that a magnitude of a computed joint speed is less than or equal to the joint speed limit for each joint in the robot, and the joint speed limit for each joint is computed using an equation including a robot stop time and predefined maximum values of robot joint velocity, acceleration and jerk, and the robot stop time is computed as a function of the obstacle data and robot capability data;
computing a commanded robot motion using the robot slowdown ratio and the desired robot motion;
using the robot slowdown ratio to compute a new position along the robot reference path, and using the new position along the robot reference path to compute the desired robot motion for a next robot control cycle; and
providing the commanded robot motion to a controller module which controls motions of the robot.

14. A system for adaptive robot velocity modification, said system comprising:
means for parameterizing a robot reference path from a set of interpolation points to a continuous reference path defined as a function of a path length;
means for providing obstacle data characterizing obstacles in a robot workspace;
means for performing a robot velocity modification calculation when indicated by the obstacle data, including determining a joint speed limit for each joint in the robot, and calculating a robot slowdown ratio as a minimum value, among all of the joints, of the joint speed limit divided by a maximum speed for each joint;
means for computing a commanded robot motion using the robot slowdown ratio and a desired robot motion;
means for using the robot slowdown ratio to compute a new position along a robot reference path, and using the new position along the robot reference path to compute the desired robot motion for a next robot control cycle; and
a robot in communication with the means for computing a commanded robot motion, said robot executing the commanded robot motion.

15. The system according to claim 14 wherein the desired robot motion and the commanded robot motion are vectors including a value for each of the joints in robot joint coordinates, and the robot reference path is either a tool center point path defined in Cartesian space or a robot motion defined in joint space.

16. The system according to claim 14 wherein performing a robot velocity modification calculation when indicated by the obstacle data includes performing the robot velocity modification calculation only when a robot-obstacle minimum distance is less than a predetermined threshold and simultaneously a robot-obstacle relative velocity is less than zero.

17. The system according to claim 14 wherein performing a robot velocity modification calculation includes performing an optimization computation having an objective function which minimizes deviation of a computed robot motion from the desired robot motion and an inequality constraint which dictates that a magnitude of a computed joint speed is less than or equal to the joint speed limit for each joint in the robot.

18. The system according to claim 14 wherein the joint speed limit for each joint in the robot is computed using an equation including a robot stop time and predefined maximum values of robot joint velocity, acceleration and jerk, and the joint speed limit for each joint is defined to have a minimum value of zero.

19. The system according to claim 18 wherein the robot stop time is computed as a function of the obstacle data and robot capability data.

20. The system according to claim 14 wherein the means for providing obstacle data is a perception system including one or more cameras or sensors configured to detect any obstacle in the workspace.

21. The system according to claim 14 wherein the system includes two or more robots having overlapping motion envelopes in the robot workspace, and the means for providing obstacle data is controllers of other robots in the system, where robot state data from the controllers of the other robots is used as the obstacle data, and where each of the robots is assigned a priority order for its velocity modification calculations at each robot control cycle.

22. The system according to claim 21 wherein the priority order is assigned based on a distance of each of the robots from a path overlap area, where a smaller distance to the overlap area corresponds to a higher priority, or the priority order is assigned based on acceleration/deceleration capability of the robots, or the priority order is assigned based on a user-defined preference.

23. The system according to claim 21 wherein the robot velocity modification calculation is performed for each of the robots in sequence, in descending priority order beginning with a highest priority robot, and where a value of the robot slowdown ratio for each robot is capped to be less than or equal to the value of the robot slowdown ratio for an immediately higher priority robot.

24. The system according to claim 14 wherein the means for performing a robot velocity modification calculation, the means for computing a commanded robot motion and the means for using the robot slowdown ratio to compute a new position are a computer having a processor, where the robot slowdown ratio is provided as feedback to a tracking module running on the computer which computes the desired robot motion for the next robot control cycle, and the commanded robot motion is provided from the computer to a robot controller which performs closed-loop feedback control of the joint motions of the robot.

25. The system according to claim 14 wherein the performing a robot velocity modification calculation, the means for computing a commanded robot motion and the means for using the robot slowdown ratio to compute a new position are a robot controller having a processor, where the robot slowdown ratio is provided to a motion system running on the robot controller, where the motion system computes the desired robot motion for the next robot control cycle using the robot slowdown ratio, and the motion system computes the commanded robot motion using the robot slowdown ratio and the desired robot motion and provides the commanded robot motion to a servo control module of the robot controller which performs closed-loop feedback control of motions of the robot.

* * * * *